Sept. 8, 1931.                    G. H. TABER                    1,822,463
               METHOD AND MACHINE FOR TESTING BRAKES OF VEHICLES
                          Filed April 18, 1928      5 Sheets-Sheet 1
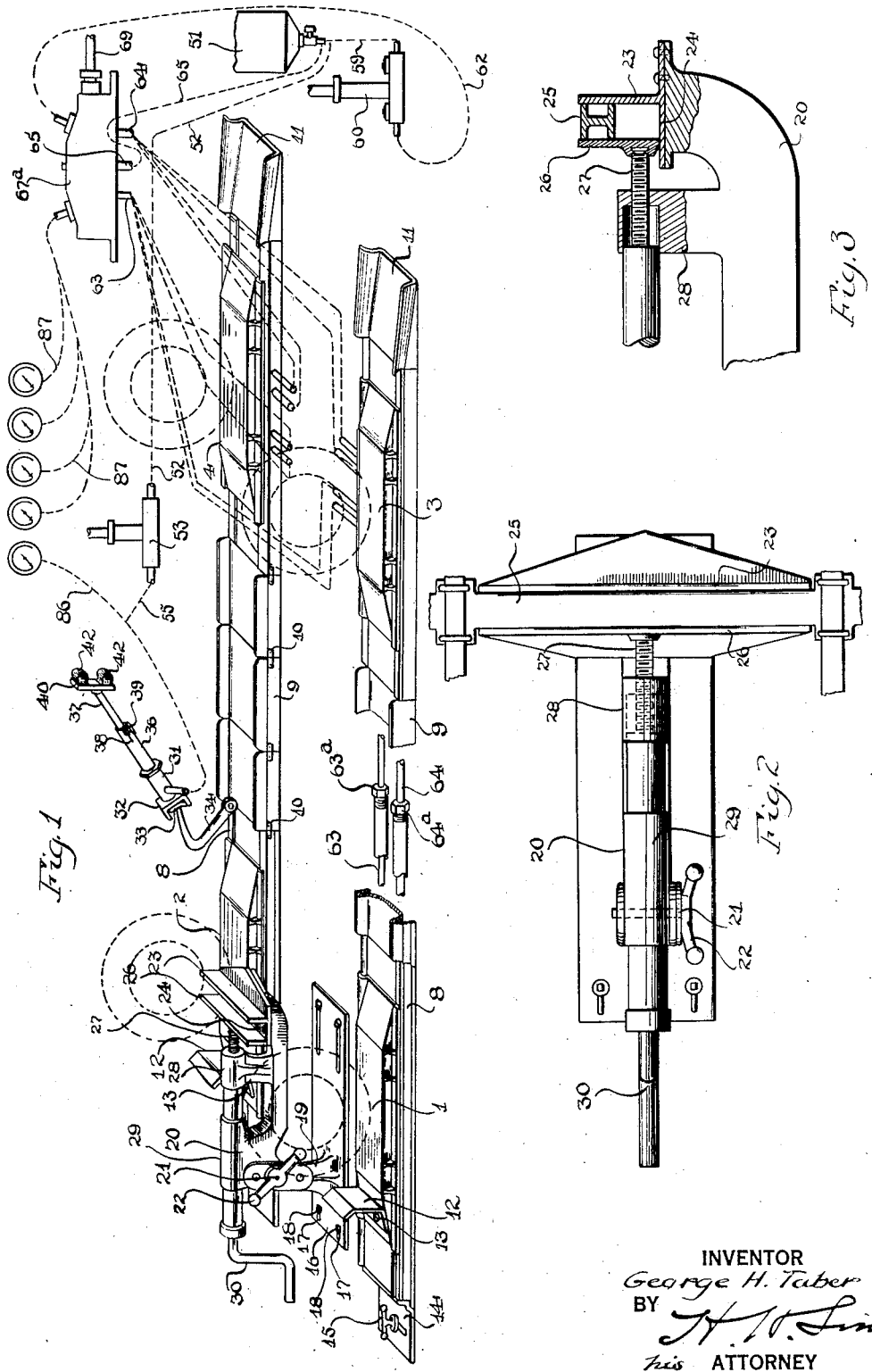
INVENTOR
George H. Taber
BY
his ATTORNEY Sept. 8, 1931.	G. H. TABER	1,822,463
METHOD AND MACHINE FOR TESTING BRAKES OF VEHICLES
Filed April 18, 1928	5 Sheets-Sheet 2
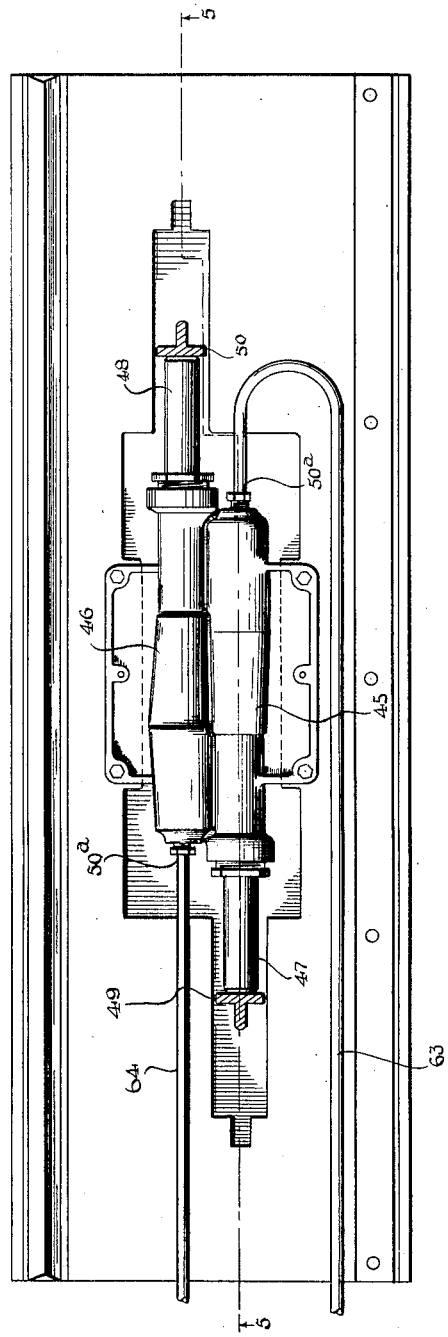
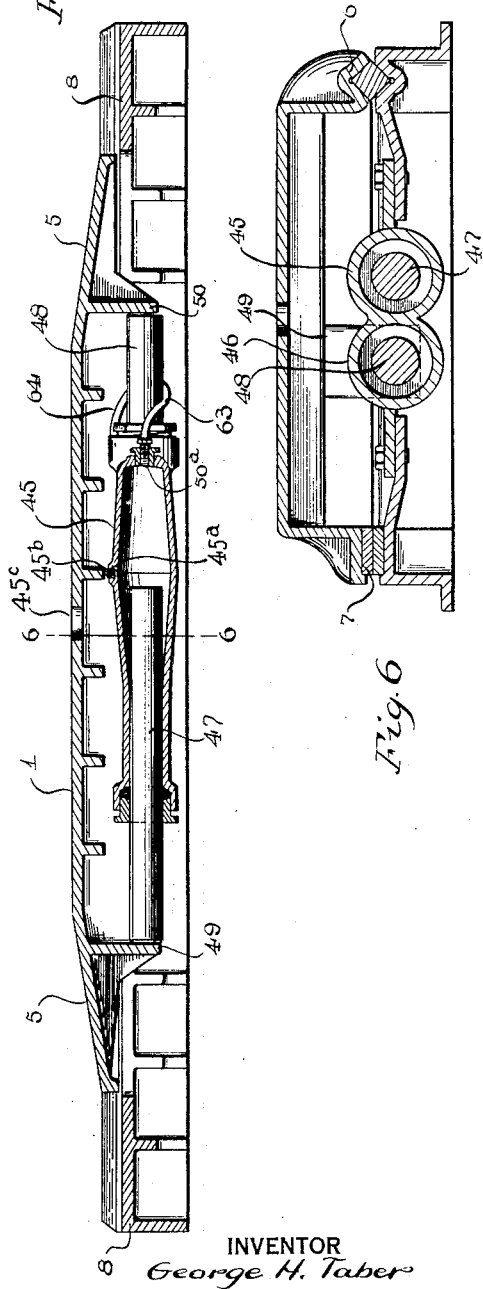
INVENTOR
George H. Taber
BY
his ATTORNEY Sept. 8, 1931.　　　G. H. TABER　　　1,822,463
METHOD AND MACHINE FOR TESTING BRAKES OF VEHICLES
Filed April 18, 1928　　5 Sheets-Sheet 3
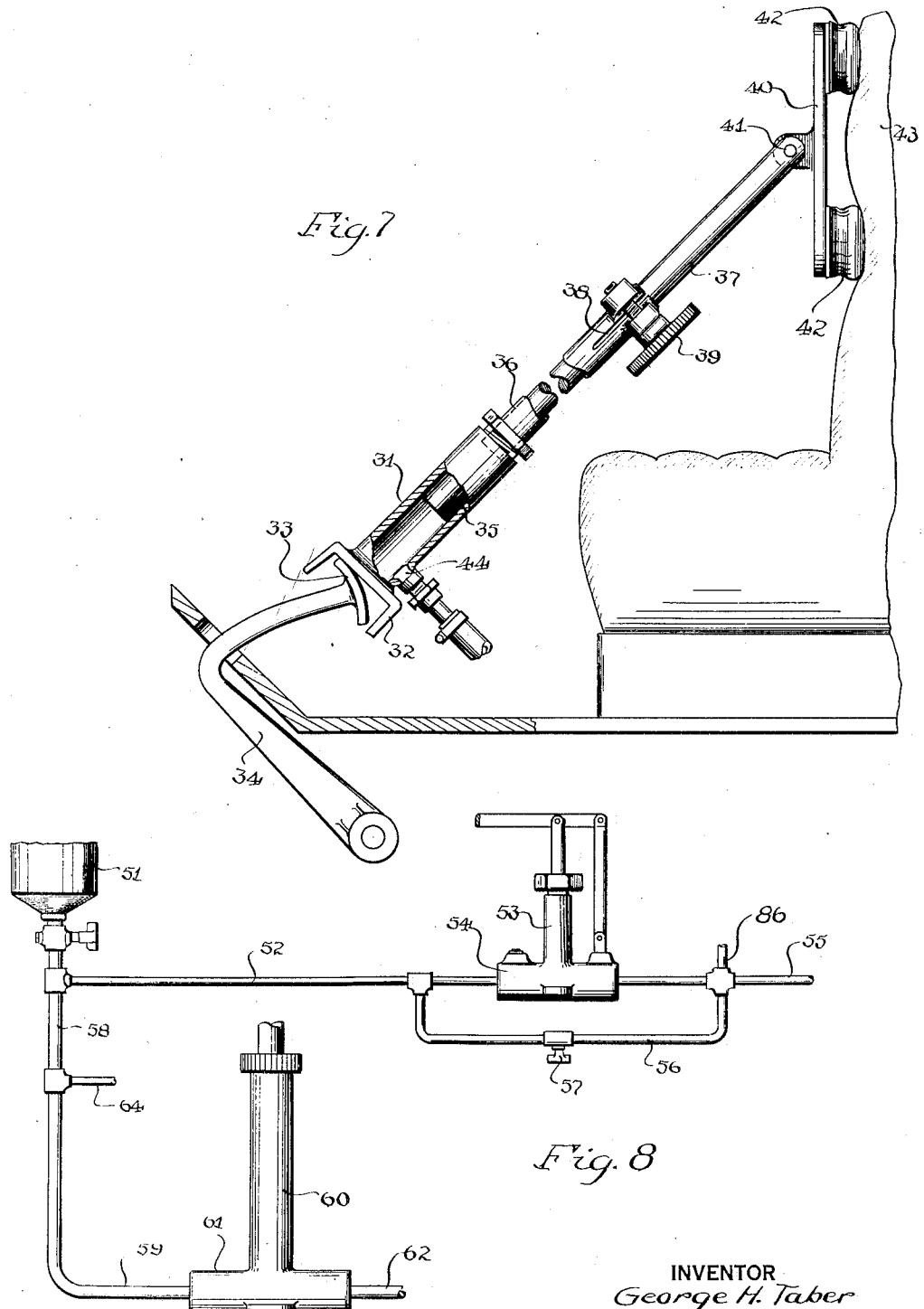

Sept. 8, 1931.   G. H. TABER   1,822,463
METHOD AND MACHINE FOR TESTING BRAKES OF VEHICLES
Filed April 18, 1928   5 Sheets-Sheet 4
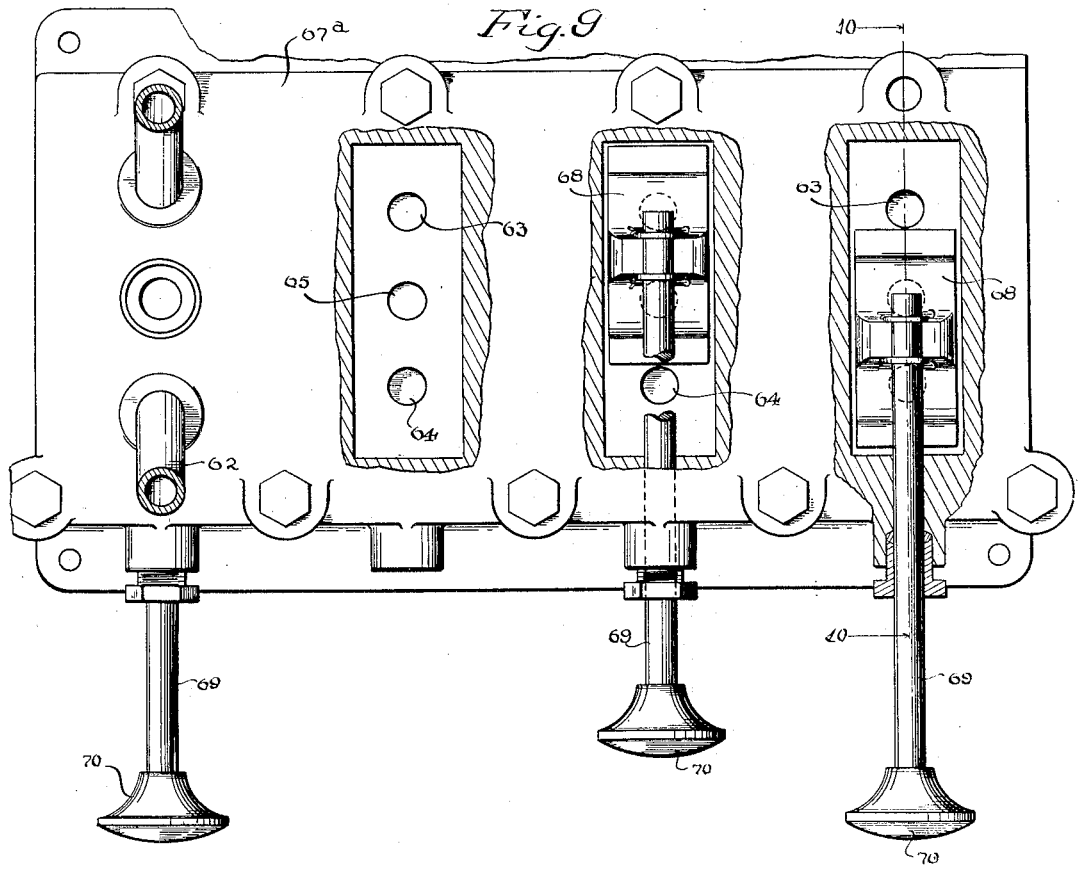
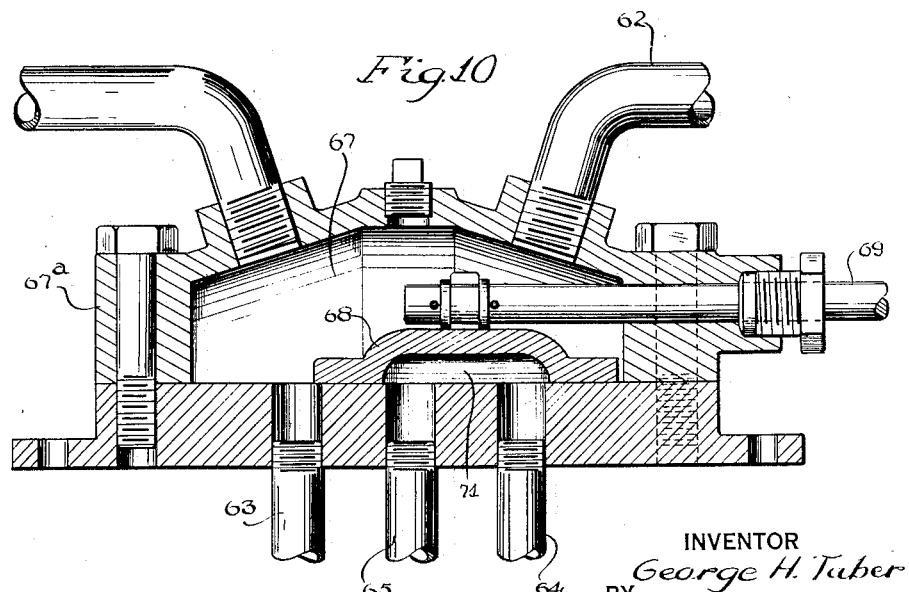
INVENTOR
George H. Taber
BY
his ATTORNEY Sept. 8, 1931. G. H. TABER 1,822,463
METHOD AND MACHINE FOR TESTING BRAKES OF VEHICLES
Filed April 18, 1928 5 Sheets-Sheet 5
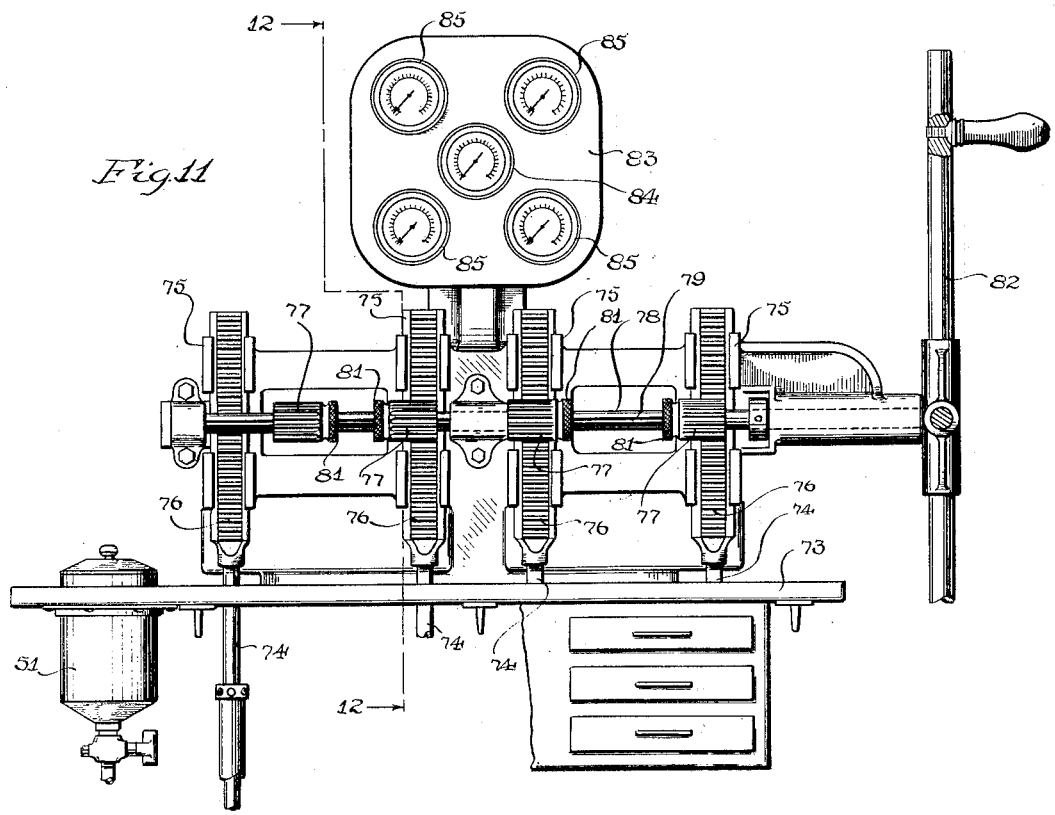
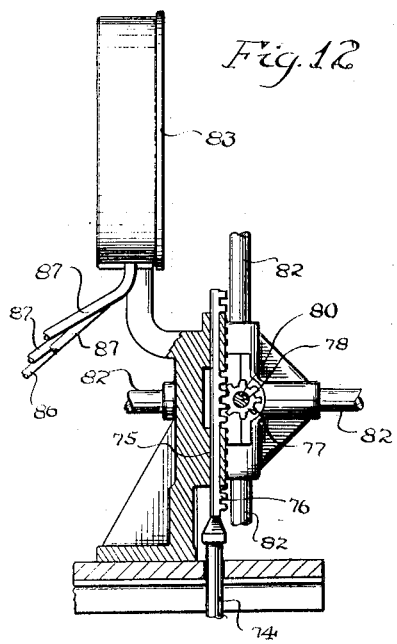
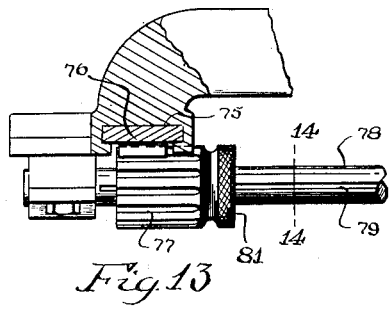
INVENTOR
George H. Taber
BY
his ATTORNEY Patented Sept. 8, 1931

1,822,463

UNITED STATES PATENT OFFICE

GEORGE H. TABER, OF BINGHAMTON, NEW YORK

METHOD AND MACHINE FOR TESTING BRAKES OF VEHICLES

Application filed April 18, 1928. Serial No. 271,031.

The present invention relates to methods and machines for testing brakes of vehicles, and an object thereof is to apply pressure to the brake mechanism through the usual control member and then apply to the wheels on which the brakes act, independently acting forces while measuring the forces applied to the wheels to test the relative efficiency of said brake mechanism on said wheels. Still another object of the invention is to provide a brake testing machine having a fluid operated brake applying mechanism with means for measuring the pressure applied to the brake mechanism, together with fluid pressure means for creating independently acting forces and means for measuring the independently acting forces to test the relative efficiency of the brake mechanism on the wheels. Another object of the invention is to provide a brake testing machine which is compact in structure, noiseless in operation and does not require any external power other than the operative to effect its operation.

To these and other ends, the invention consists of certain parts and combinations of parts all of which will be hereinafter described: the novel features being pointed out in the appended claims.

In the drawings:

Fig. 1 is a perspective view partially diagrammatic illustrating one embodiment of this invention;

Fig. 2 is a plan view of the vehicle holding means;

Fig. 3 is a fragmentary sectional view of the holding means;

Fig. 4 is a bottom view of one of the bases which carries one of the vehicle supports;

Fig. 5 is a vertical longitudinal section through one of the supports and the base on which it is mounted;

Fig. 6 is a transverse section on the line 6—6, Fig. 5;

Fig. 7 is a side view partially in section of the brake pressure applying means arranged in position on the vehicle;

Fig. 8 is a fragmentary detail view of the fluid pressure operating means;

Fig. 9 is a plan view of the controlling valves partially in section;

Fig. 10 is a vertical section on the line 10—10, Fig. 9;

Fig. 11 is a fragmentary view in elevation showing the operating means for the pumps as well as the force measuring devices;

Fig. 12 is a section on the line 12—12, Fig. 11;

Fig. 13 is a fragmentary sectional view showing the driving connection between the common operating shaft and the pump rods; and Fig. 14 is a section on the line 14—14, Fig. 13.

In the illustrated embodiment of the invention the apparatus is designed for testing the brakes of four wheels of a vehicle simultaneously but it will be understood that it is not limited to the testing of the entire four wheels of a vehicle. The vehicle while being tested has its front wheels resting upon front supports 1 and 2 and its rear wheels resting upon rear supports 3 and 4.

It will be unnecessary to describe each of these supports in detail as one is substantially a duplicate of the other, therefore, only the support 1 will be described. This support has a flat top face with inclined portions 5 at opposite ends thereof to permit a wheel to readily run onto and off the support, the surface preferably being coated with a road material such as concrete, asphalt or a similar material which will give substantially the same effect as a roadway on the tires. The support is guided in the direction of travel of a vehicle preferably by a sliding movement, and, to this end, has guides 6 and 7 at opposite sides thereof movable on a base 8. Two of these bases 8 are aligned with each other and have an intervening run or trackway which in order to adapt the apparatus to vehicles having different lengths may be made extensible and consist, in this instance, of a number of sections 9 secured together by straps 10. It is apparent that by arranging two pairs of these bases 8 in parallel relation to the intervening sections 9, two runways will be provided with the four supports 1, 2, 3 and 4 for cooperating with the four wheels of the vehicle. At one end of the two runways, two entrance guides 11 may be provided which will guide the vehicle thereon. To the forward supports 1 and 2 stop pieces 12 may be bolted at 13 to limit the forward movement of the vehicle. A securing piece 14 may be bolted to the forward bases 8 and in turn be adjustably held by a hand screw 15 to the flooring or surface on which the runways rest, permitting the runways to be adjusted toward and from each other to accommodate them to the distance between the wheels of different vehicles.

With the end in view of holding the vehicle against movement on the movable supports 1, 2, 3 and 4, a holding means may be provided comprising, in this instance, a base member 16 having slots 17 through which bolts 18 may be passed to adjustably secure the base member in its desired position. On this base member 16 is provided an upright 19 to which a clamping frame 20 is pivoted at 21 so as to be held in different angular positions to accommodate the clamp to the height of the axle of the vehicle, a hand nut 22 being provided to hold the frame in the position to which it is adjusted. The clamping frame has a fixed clamp 23 rigid therewith and provided with a flat surface 24 to one side thereof which may be brought into engagement with the front axle 25 of the motor vehicle. A clamp 26 is movable toward the fixed clamp 23 so that the axle 25 may be held between the two clamps 23 and 26. A screw 27 has screw threaded engagement with the post 28 on the clamping frame 20 and sliding engagement with the post 29 on the clamping frame 20. At its outer end, the screw has a crank handle 30 through which it may be turned in order to move the clamp 26 toward and from the clamping member 23.

With the end in view of applying a determined amount of pressure to the brakes of the vehicle to be tested, there may be provided a suitable pressure applying means comprising, in this instance, a cylinder 31 having a yoke 32 at one end which is adapted to straddle the foot piece 33 of a brake applying lever 34 connected with the brakes of a vehicle. Within this cylinder 31 is a piston 35 which has an extensible stem formed of an inner part 36 connected to the piston and an outer part 37 slidable in the part 36, the part 36 being split at 38 and being compressed upon the part 37 by a clamping screw 39 to hold the parts 36 and 37 against a relative sliding movement but permitting the movement to obtain the adjustment of the length of the stem. The stem also carries an abutment 40 which is preferably pivoted at 41 to the stem and has two separated pads 42 adapted to cooperate with the back of a seat 43 or other fixed part on the vehicle. Admission of a fluid, such for instance as oil, through the port 44 will cause the cylinder 31 to press down on the pedal 33 and apply the brake. This port 44 also acts as an exhaust port.

Each one of the supports 1, 2, 3 and 4 is provided with a force applying means acting independently of each other and subject to simultaneous or independent control. Each force applying means preferably shifts the support in the direction of its longitudinal axis or longitudinally of the vehicle so that while a determined pressure is applied to the brakes, the wheels may be acted upon by the supports to test their braking actions. In this instance, the supports may be moved in either direction. The means for accomplishing this action embodies two motor devices for each support. These motor devices, in this instance, comprise fluid pressure motors in the form of two cylinders 45 and 46 opening in opposite directions and formed so as to provide an enlarged central portion which is provided with an air vent 45ª, the plug 45ᵇ of which may be removed through an opening 45ᶜ in the support 1, 2, 3 or 4. These cylinders have plungers or pistons 47 and 48 respectively operating therein, said pistons extending beyond the cylinders and cooperating respectively with abutments 49 and 50, the piston 47 moving the support forwardly and the piston 48 moving the support rearwardly. Fluid of any kind but preferably an oil is admitted into and exhausted from each cylinder by a port 50ª.

With the end in view of controlling the fluid pressure in the different cylinders 45 and 46 as well as in the cylinder 31 from a common source there may be provided a tank 51 which is preferably arranged above all of the other portions of the fluid operating and controlling means in which the fluid is arranged so that it tends to maintain the fluid connections in a filled condition and free from air pockets. From this tank, a piping 52 may lead to a force pump 53 which has check valves 54 at its intake and its discharge and which connects by a piping 55 with the port 44 of the cylinder 31 so that the fluid may be forced by the pump 53 into the cylinder 31 to create the desired pressure therein. A by-pass 56 is provided about the force pump 53 and has a hand operated valve 57 therein which when opened relieves the pressure in the cylinder 31. This tank 51 also connects by a piping 58 with the pipings 59 of four force pumps 60. Each of the force pumps 60 has a valved intake and a valved outlet 61 which by a piping 62 connects with a controller which has two pipings 63 and 64 one leading to one of the cylinders 45 and the other leading to one of the cylinders 46. This controller also has a piping 65 which connects with the tank 51. The pipings 63 and 64, in this instance, are arranged below the runways to connect with the different cylinders and in order that two supports on a single runway may be adjusted relatively to each other the pipings 63 and 64 leading to one of the supports of each runway are provided with telescopic joints 63ª and 64ª which permit the extension and contraction of the pipings 63 and 64 with the adjustment of the distance between the two supports of the runway.

In the illustrated embodiment, each controller, of which there are four, comprises a chamber 67 to which the piping 62 leads from the pump 60. The bottom of this chamber is provided with three ports which communicate with the pipings 63, 64, and 65, the port of the piping 65 being intermediate or between that of the pipings 63 and 64. On the bottom of this chamber is movable a slide valve 68 through the means of a stem 69 with a handle 70 at its outer end, permitting the manual operation of the valve. The valve 68 in one position opens the pipe 62 to the pipe 63 and closes the pipe 64 and 65 to the pipe 63, while at the same time providing a passageway between the pipes 64 and 65 by way of a port 71 in the under side of the valve. In another position of the valve 68, the pipe 62 connects with the pipe 64 while the pipes 63 and 65 are connected by the passage 71. In this way, when the valve is in one position, the fluid under pressure by one of the pumps 60 is transmitted to one of the cylinders 45 and at the same time the pressure is relieved in the cylinder 46 by way of the pipes 64 and 65. When the valve 68 is in the other position, the pressure of the force pump is communicated to the cylinder 46 by way of the piping 64 and the pressure is relieved in the cylinder 45 by way of the pipings 63 and 65. It is preferred to provide all of the chambers 67 of the four valves in a single casing 67ª so that the valve handles 70 may be arranged in juxtaposition.

With the end in view of controlling all of the pumps 60 simultaneously, said pumps are mounted on a stand or support 73 and each has its pistons 74 guided on the stand at 75 and provided with a rack 76, all the racks being arranged in the same vertical plane and being engaged by pinions 77 on a shaft 78 which is journalled in the frame 75. This shaft 78 has a longitudinal extending way 79 in which keys 80 on the pinions 77 operate. This arrangement permits the pinions through the knurled portions 81 to be moved into and out of engagement with the respective racks 76 in order to make or break connection between the shaft 78 and the pumps. The shaft 78 may be moved by a hand wheel 82 so as to impart rotation to the pinions 74 or as many as may be connected with the shaft 78.

It is desirable to provide measuring means for determining the amount of pressure applied to the brakes through the brake pressure applying mechanism and also a measuring means for determining the amount of power applied to the supports 1, 2, 3 and 4 for moving them so that the relative resistance to the movements of the brake applied wheels of the vehicle may be obtained. In this instance, on the frame 75 is arranged a head 83 which contains five fluid pressure measuring instruments of known construction, one at the center indicated at 84 and four surrounding the center instrument and indicated at 85. The center instrument connects by a piping 86 with the pipe 55 between the force pump 53 and the cylinder 31 so that the pressure in the cylinder 31 is indicated on the dial 84. To the end that only one indicator will be required, for the two cylinders on each support 1, 2, 3 and 4, a piping 87 leads from each pressure measuring instrument 85 to one of the chambers 67 of the controlling mechanism for such cylinders 45 and 46 so that the fluid under pressure in any chamber 67 whether discharged through the pipe 63 or the pipe 64 will be transmitted to the pressure measuring instrument 85 connecting with such chamber 67.

In the operation of this invention, the motor vehicle is driven onto the supports 1, 2, 3 and 4 and is secured at its front axle by means of the clamping members 22 and 26 so that it cannot as a whole partake of movement in either direction. The brake pressure applying mechanism is then connected with the brake pedal 34. Thereafter, the pump 53 is operated and causes the piston to press the brake pedal 34 with a desired pressure which will be indicated on the measuring instrument 84. The valves 68 are then adjusted so as to connect the pipes 64 with the pipes 65, assuming that brakes on four wheels of the vehicle ought to be tested and the pinions 77 are moved into engagement with the racks 76. The hand wheel 82 being now turned thus operates all the pumps 60 and forces the liquid under pressure into the cylinders 45. The fluid through the pistons 48 moves the supports 1, 2, 3 and 4 rearwardly, thus imparting to the wheels, if the brakes do not hold them, a rotation. If the brakes hold or lock any one or more of the wheels, the wheel does not operate and the support cooperating with such wheel slides under the pressure imparted to the support, but if any one or more of the wheels is not held by the brakes, then the wheel turns on the movement of the support. In each instance, however, the pressure of the fluid will be indicated as to the degree of the braking efficiency on the measuring device connected with such support. To test the action of the brakes in the other direction or in the driving direction of the wheels, the valves 68 are moved to connect the passages 63 with the passages 65 and the machine is operated as before and note is made of the indications of the measuring instruments to determine the actions of the brakes under this test.

The operation of the invention will be understood from the foregoing but it may be summarized as follows: the vehicle is driven upon the four supports 1, 2, 3 and 4 and is then secured at its front axle by the pivoted clamp or holding means which is elongated so as to hold the axle near the spring clips, thus preventing springing of the axle, this holding clamp being so formed that it will embrace the front axle and project between the splasher plate and the front axle. The brake applying means is then mounted, as shown in Fig. 7, with the abutment 42 shown against the back of the seat and the yoke 32 over the pedal 33. The pump 33 is now operated to create the desired pressure on the pedal, this pressure being indicated on the fluid pressure plate 84. The valve members 68 are now adjusted to direct the fluid to either one of the cylinders 45 or 46 and the hand wheel is turned to create pressure in said cylinder. The variation in braking action on any one of the wheels will be indicated on the dial 85 connected with the fluid device operated on such wheel by reduction of pressure on the dial. By holding the car and working the wheels back and forth through the fluid means, it is possible to detect loose spring clips, broken springs, brake connections and other causes of interference with brake adjustment, and this is assisted by the silence of the machine. The controlling means for the pump allows for the proper degree of leverage and gives a continuous pressure. The fluid operated means makes it possible to give to the support a uniform travel of distance and uniform speed and still have a great variation of pressure. The controlling valve eliminates the use of extra pumps and permits one pressure gage to register the pressure in two cylinders. It is also possible to give a predetermined braking efficiency on the rear wheels over those in front. The apparatus may be operated without the expense of electricity or other outside power. It is noiseless so that the operator can hear any noise and looseness in the vehicle he wishes to locate. A maximum amount of power is obtainable by the fluid operated means and this power is registered accurately. The contact between the tires and the supports is similar to that which would be met on the road. The flat sliding support makes it possible to retain engagement with the tire of the wheel at all times in a neutral line with the axis of turning of the wheel. The apparatus occupies a small space and its operating cost is practically nothing. It can be operated by one man.

What I claim as my invention and desire to secure by Letters Patent is:

1. A machine for testing brakes of vehicles comprising a movable member for engaging the wheel held by the braking mechanism of the vehicle, two fluid operated devices respectively for moving said member in opposite directions, a force pump, and a controlling valve arranged between the force pump and the two fluid operated devices, having means for directing the pressure from the force pump to either of said devices while relieving the pressure in the other of said devices.

2. A machine for testing brakes of vehicles comprising a movable member for engaging the wheel held by the braking mechanism of the vehicle, two fluid operated devices respectively for moving said member in opposite directions, a force pump, a controlling valve arranged between the force pump and the two fluid operated devices, having means for directing the pressure from the force pump to either of said devices while relieving the pressure in the other of said devices, and a pressure measuring device arranged between the force pump and the two fluid operated devices in a position to measure the fluid pressure delivered to either one of said fluid operated devices.

3. A machine for testing brakes of vehicles comprising a movable member for engaging the wheel held by the braking mechanism of the vehicle, two fluid operated devices respectively for moving the member in opposite directions, a force pump, and a controlling valve arranged between the force pump and the two fluid operated devices, said controlling valve having a chamber connecting with the force pump and each of the fluid operated devices and also with the relief passage, and said controlling valve also having a valve movable in the chamber to connect either one of the fluid operated devices with the force pump and the other with the relief passage.

4. A machine for testing brakes of vehicles comprising a movable member for engaging the wheel held by the braking mechanism of the vehicle, two fluid operated devices respectively for moving the member in opposite directions, a force pump, a controlling valve arranged between the force pump and the two fluid operated devices, said controlling valve having a chamber connecting with the force pump and each of the fluid operated devices and also with the relief passage, and said controlling valve also having a valve movable in the chamber to connect either one of the fluid operated devices with the force pump and the other with the relief passage, and a pressure measuring device connecting with said chamber of the controlling valve so that the pressure in said chamber is communicated to the pressure measuring device when either of said fluid operated devices is operated.

5. A machine for testing brakes of vehicles comprising means for holding the vehicle against movement, a plurality of movable members for engaging the wheels respectively held by the braking mechanism of a vehicle, fluid operated devices each for moving one of said members, force pumps each for moving one of said fluid operated devices, and a common operating means for said force pumps.

6. A machine for testing brakes of vehicles comprising means for holding the vehicle against movement, a plurality of movable members for engaging the wheels respectively held by the braking mechanism of a vehicle, fluid operated devices each for moving one of said members, force pumps each for moving one of said fluid operated devices, and a common operating means for said force pumps having breakable connection with each pump so that any one or more of the pumps may be operated by said common operating means.

GEORGE H. TABER.